United States Patent
Toda et al.

(10) Patent No.: US 11,326,967 B2
(45) Date of Patent: May 10, 2022

(54) STRAIN GAUGE WITH IMPROVED TEMPERATURE EFFECT DETECTION

(71) Applicant: MINEBEA MITSUMI Inc., Nagano (JP)

(72) Inventors: Shinya Toda, Shizuoka (JP); Atsushi Kitamura, Shizuoka (JP); Akiyo Yuguchi, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 26 days.

(21) Appl. No.: 16/965,118

(22) PCT Filed: Jan. 30, 2019

(86) PCT No.: PCT/JP2019/003228
§ 371 (c)(1),
(2) Date: Jul. 27, 2020

(87) PCT Pub. No.: WO2019/151345
PCT Pub. Date: Aug. 8, 2019

(65) Prior Publication Data
US 2021/0033476 A1    Feb. 4, 2021

(30) Foreign Application Priority Data
Feb. 2, 2018    (JP) .............................. JP2018-017051

(51) Int. Cl.
*G01L 1/22*    (2006.01)
*G01B 7/16*    (2006.01)
(Continued)

(52) U.S. Cl.
CPC .............. *G01L 1/2287* (2013.01); *G01B 7/18* (2013.01); *G01D 21/02* (2013.01); *G01K 7/22* (2013.01)

(58) Field of Classification Search
None
See application file for complete search history.

(56) References Cited

U.S. PATENT DOCUMENTS

| 5,914,168 A | 6/1999 | Wakamatsu et al. |
| 2003/0016116 A1 | 1/2003 | Blaha |

(Continued)

FOREIGN PATENT DOCUMENTS

| CN | 105765671 | 7/2016 |
| CN | 107267944 | 10/2017 |

(Continued)

OTHER PUBLICATIONS

International Search Report for PCT/JP2019/003228 dated May 7, 2019.

(Continued)

*Primary Examiner* — Lisa M Caputo
*Assistant Examiner* — Nigel H Plumb
(74) *Attorney, Agent, or Firm* — IPUSA, PLLC

(57) ABSTRACT

A strain gauge includes a strain detecting unit and a temperature detecting unit that are formed on or above a flexible substrate. The strain detecting unit includes a resistor formed as a film containing Cr, CrN, and $Cr_2N$, on one surface of a functional layer. A first metallic layer formed of a material of which a gauge factor is less than that of the resistor is laminated on a folded portion, and a resistance value of the first metallic layer on the folded portion is less than a resistance value of the folded portion. The temperature detecting unit is a thermocouple including a second metallic layer formed of a same material as the resistor, on or above the substrate; and a third metallic layer formed of a same material as the first metallic layer, on the second metallic layer.

11 Claims, 8 Drawing Sheets

(51) Int. Cl.
*G01D 21/02* (2006.01)
*G01K 7/22* (2006.01)

(56) References Cited

U.S. PATENT DOCUMENTS

| | | |
|---|---|---|
| 2015/0030408 A1 | 1/2015 | Groche et al. |
| 2016/0358701 A1 | 12/2016 | Koda et al. |
| 2017/0122783 A1 | 5/2017 | Xue et al. |

FOREIGN PATENT DOCUMENTS

| | | |
|---|---|---|
| EP | 725392 | 8/1996 |
| JP | S48-017777 | 3/1973 |
| JP | S59-075676 | 4/1984 |
| JP | H03-191802 | 8/1991 |
| JP | H06-300649 | 10/1994 |
| JP | H07-190709 | 7/1995 |
| JP | H08-102163 | 4/1996 |
| JP | H09-016941 | 1/1997 |
| JP | 2007-173544 | 7/2007 |
| JP | 2015-031633 | 2/2015 |
| JP | 2015-512511 | 4/2015 |
| JP | 2016-074934 | 5/2016 |
| JP | 2016-136605 | 7/2016 |
| JP | 2017-523436 | 8/2017 |

OTHER PUBLICATIONS

Office Action dated Dec. 2, 2021 with respect to the corresponding Chinese patent application No. 201980010674.0.
Office Action dated Feb. 22, 2022 with respect to the corresponding Japanese patent application No. 2018-017051.

STRAIN GAUGE WITH IMPROVED TEMPERATURE EFFECT DETECTION

TECHNICAL FIELD

The present invention relates to a strain gauge.

BACKGROUND ART

A strain gauge is known to be attached to a measured object to detect strain of the measured object. The strain gauge includes a resistor for detecting strain, and as a resistor material, for example, material including Cr (chromium) or Ni (nickel) is used (see, for example, Patent document 1).

CITATION LIST

Patent Document

Patent document 1 Japanese Unexamined Patent Application Publication No. 2016-74934

SUMMARY

However, when a resistance value of the resistor varies according to temperature and there is variation in a temperature coefficient of resistance, strain cannot be detected accurately.

In view of the point described above, an object of the present invention is to provide a strain gauge capable of outputting ambient temperature information of a resistor.

A strain gauge includes a strain detecting unit and a temperature detecting unit that are formed on or above a flexible substrate. The strain detecting unit includes a resistor formed of material including at least one from among chromium and nickel, on or above the substrate. The resistor includes a plurality of resistive patterns that are juxtaposed; and a folded portion that connects end portions of giver, resistive patterns that, are next to each other. A first metallic layer formed of a material of which a gauge factor is less than that of the resistor is laminated on the folded portion, and a resistance value of the first metallic layer on the folded portion is less than a resistance value of the folded portion. The temperature detecting unit is a thermocouple including a second metallic layer formed of a same material as the resistor, on or above the substrate; and a third metallic layer formed of a same material as the first metallic layer, on the second metallic layer.

EFFECTS OF THE INVENTION

According to the disclosed technique, a strain gauge capable of outputting ambient temperature information of a resistor can be provided.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
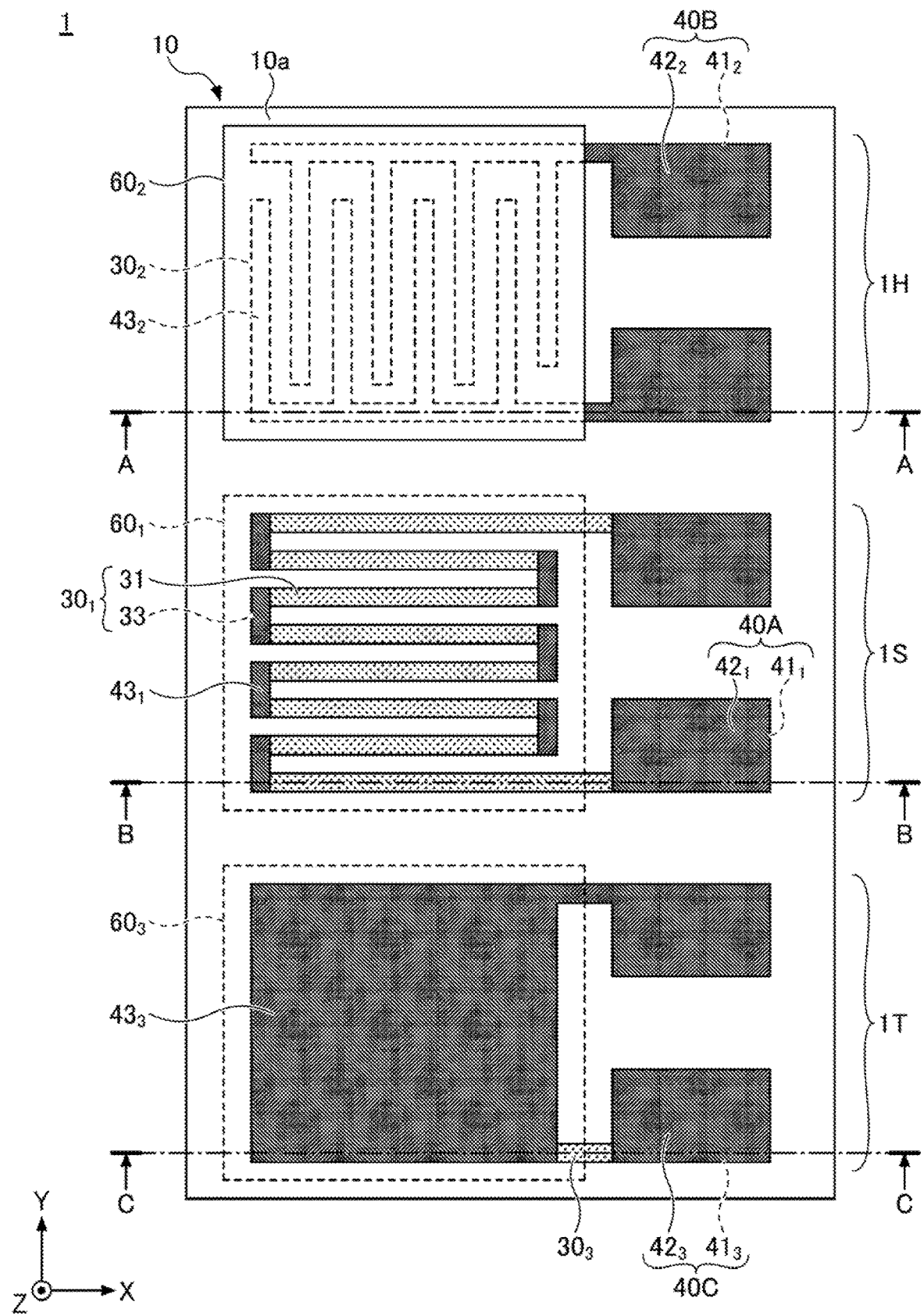
FIG. 1 is a plan view (part 1) of an example of a strain gauge according to a first embodiment.
Figure 2:
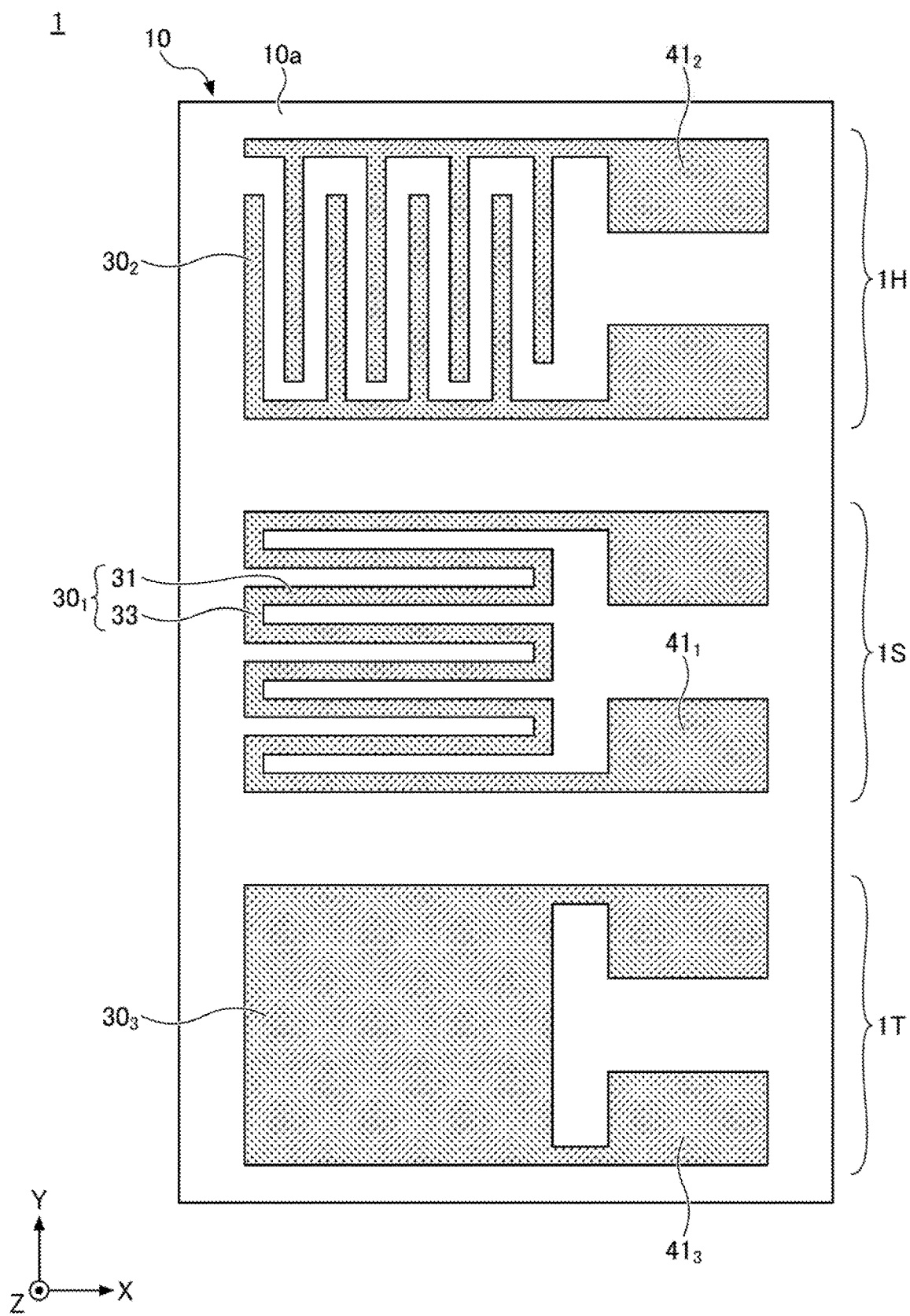
FIG. 2 is a plan view (part 2) of an example of the strain gauge according to the first embodiment.
Figure 3A:
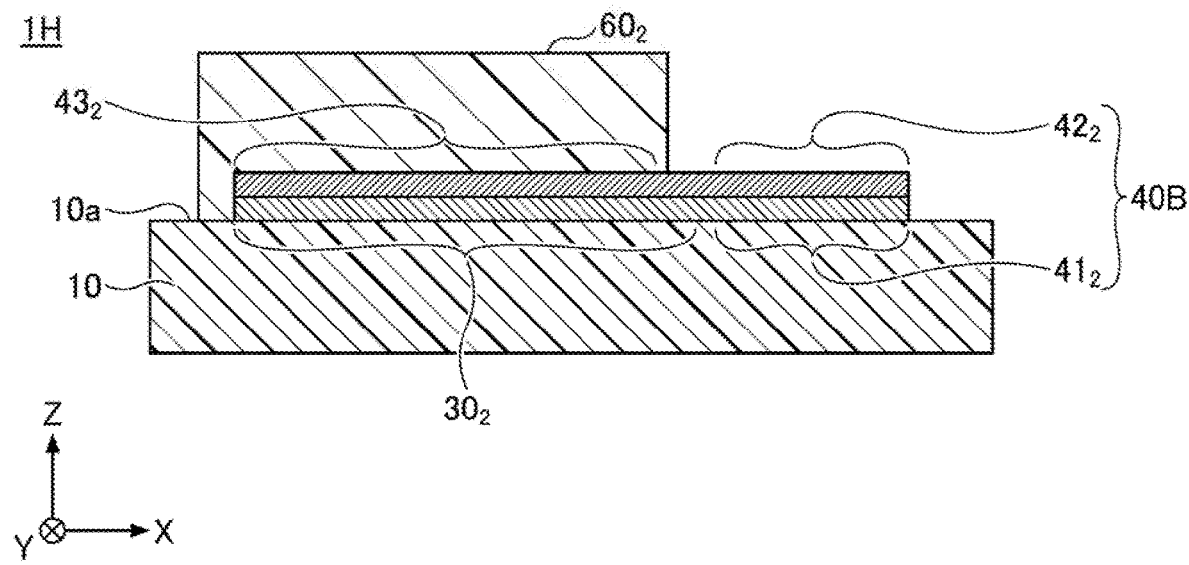
FIG. 3A is a cross-sectional view (part 1) of an example of the strain gauge according to the first embodiment.
Figure 3B:
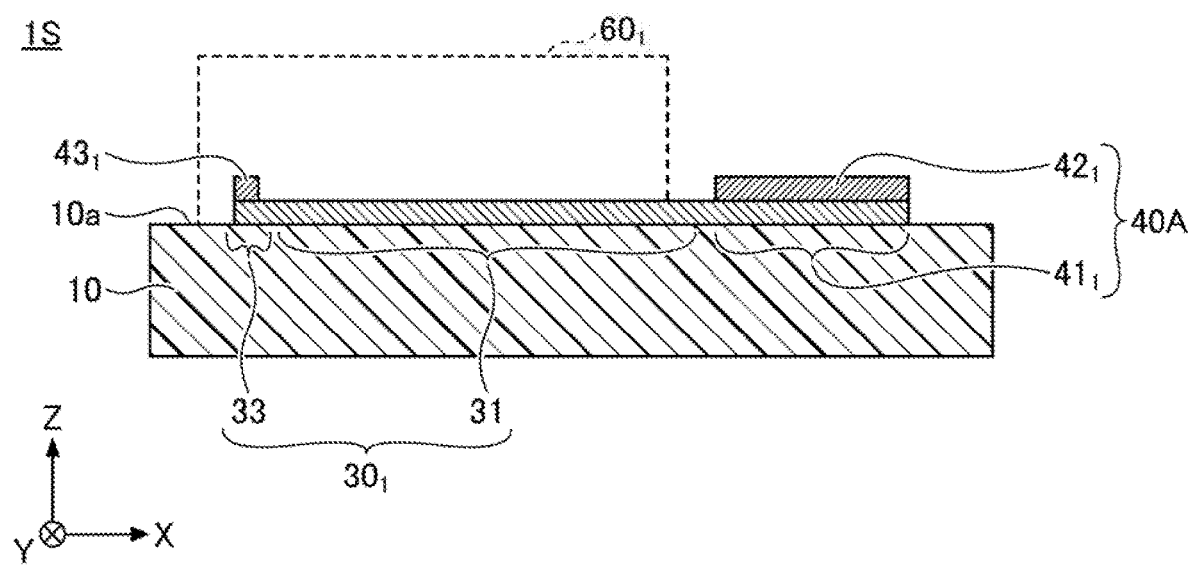
FIG. 3B is a cross-sectional view (part 2) of an example of the strain gauge according to the first embodiment.
Figure 3C:
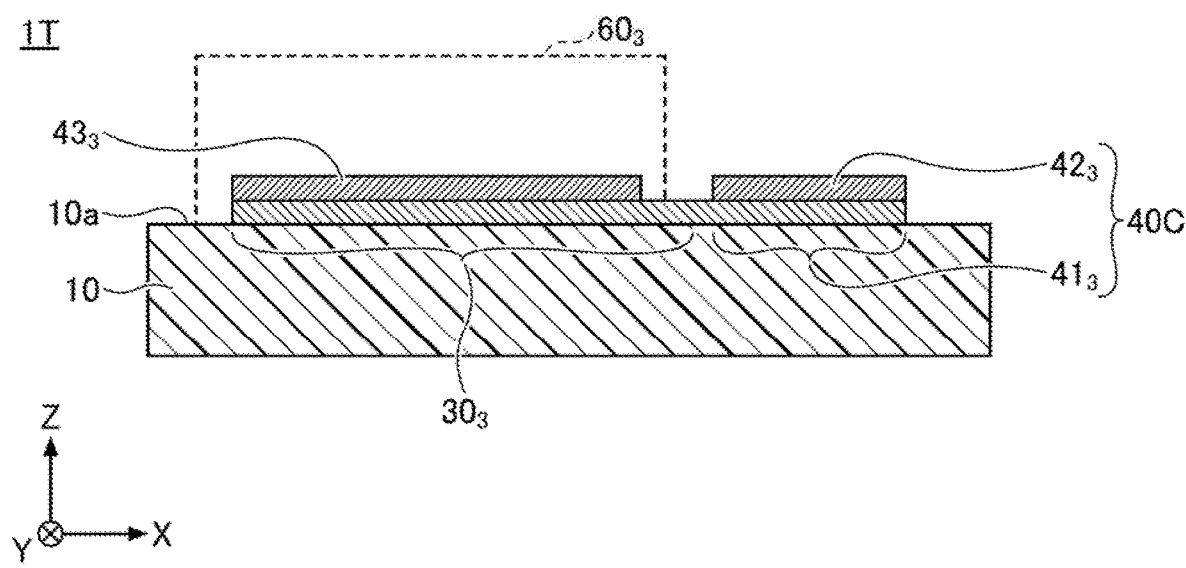
FIG. 3C is a cross-sectional view (part 3) of an example of the strain gauge according to the first embodiment.

FIG. 1 is a plan view of an example of a strain gauge according to a first embodiment. FIG. 2 is a plan view of an example of the strain gauge according to the first embodiment, and illustrates a first layer only. FIGS. 3A to 3C are cross-sectional views of an example of the strain gauge according to the first embodiment. FIG. 3A illustrates a cross section taken along the A-A line in FIG. 1, FIG. 3B illustrates a cross section taken along the B-B line in FIG. 1, and FIG. 3C illustrates a cross section taken along the C-C line in FIG. 1.

Referring to FIG. 1, FIG. 2, and FIGS. 3A to 3C, the strain gauge 1 includes a strain detecting unit 1S, a humidity detecting unit 1H, and a temperature detecting unit 1T that are formed on the same substrate 10. The strain detecting unit 1S, the humidity detecting unit 1H, and the temperature detecting unit 1T are each independently arranged and are not electrically connected to each other.

Note that in FIGS. 1 and 2, the humidity detecting unit 1H, the strain detecting unit 1S, and the temperature detecting unit 1T are arranged from the top side of the paper, but are not limited thereto. Any arrangement of the humidity detecting unit 1H, the strain detecting unit 1S, and the temperature detecting unit 1T can be performed.

The strain detecting unit 1S includes a resistor $30_1$, electrodes 40A, and a metallic layer $43_1$ that are each formed on or above the substrate 10.

Note that in the present embodiment, for the sake of convenience, with respect to the strain gauge 1, the side of the substrate 10 where the resistor $30_1$ is provided is referred to as an upper side or one side; and the side of the substrate 10 where the resistor $30_1$ is not provided is referred to as a lower side or another side. Further, for each component, the surface on the side where the resistor $30_1$ is provided is referred to as one surface or an upper surface; and the surface on the side where the resistor $30_1$ is not provided is referred to as another surface or a lower surface. However, the strain gauge 1 can be used in a state of being upside down, or be disposed at any angle. Further, a plan view means that an object is viewed from a direction normal to an upper surface 10a of the substrate 10, and a planar shape refers to a shape of an object when viewed from the direction normal to the upper surface 10a of the substrate 10.

The substrate 10 is a member that is a base layer for forming the resistor $30_1$ or the like and is flexible. The thickness of the substrate 10 is not particularly restricted, and can be appropriately selected for any purpose. For example, such a thickness can be approximately between 5 µm and 500 µm. In particular, when the thickness of the substrate 10 is between 5 µm and 200 µm, it is preferable in terms of strain transfer from a flexure element surface that is bonded to a lower surface of the substrate 10 via an adhesive layer or the like; and dimensional stability with respect to environment, and when the thickness is 10 µm or more, it is further preferable in terms of insulation.

The substrate 10 can be formed of an insulating resin film such as a PI (polyimide) resin, an epoxy rosin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 µm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The resistor $30_1$ is a thin film formed in a predetermined pattern and is a sensitive section where resistance varies according to strain. The resistor $30_1$ may be formed directly on the upper surface 10a of the substrate 10, or be formed above the upper surface 10a of the substrate 10, via other layer (s).

The resistor 305 can be formed of, for example, material including Cr (chromium); material including Ni (nickel); or material including both of Cr and Ni. In other words, the resistor $30_1$ can be formed of material including at least one from among Cr and Ni. An example of the material including Cr includes a Cr composite film. An example of the material including nickel includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of the resistor $30_1$ is not particularly restricted, and can be appropriately selected for any purpose. The thickness can be, for example, approximately between 0.05 µm and 2 µm. In particular, when the thickness of the resistor $30_1$ is 0.1 µm or more, it is preferable in terms of improvement in crystallinity (e.g., crystallinity of α-Cr) of a crystal that constitutes the resistor $30_1$, and when the thickness of the resistor $30_1$ is 1 µm or less, it is further preferable in terms of reduction in cracks of a given film caused by internal stress of the film that constitutes the resistor $30_1$, or reduction in warp in the substrate 10.

For example, when the resistor $30_1$ is the Cr composite film, the resistor is formed with α-Cr (alpha-chromium) as the main component having a stable crystalline phase, so that stability of the gauge characteristics can be improved. Additionally, when the resistor $30_1$ is formed with α-Cr as the main component, a gauge factor of the strain detecting unit 1S can be 10 or more, as well as a gauge factor temperature coefficient TCS and temperature coefficient of resistance TOR being each able to be in the range of from −1000 ppm/° C. to +1000 ppm/° C. Here, a main component means that a target substance is 50% by weight or more of total, substances that constitute the resistor. The resistor $30_1$ preferably includes α-Cr at 80% by weight or more, from the viewpoint of improving the gauge characteristics. Note that α-Cr is Cr having a bcc structure (body-centered cubic structure).

The electrodes 40A extend from both end portions of the resistor $30_1$ and are each wider than the resistor $30_1$ to have an approximately rectangular shape in a plan view. The electrodes 40A are a pair of electrodes from which a change in a resistance value of the resistor $30_1$ according to strain is output externally, where, for example, a lead wire for an external connection, or the like is joined. For example, the resistor $30_1$ extends from one of the electrodes 40A, with zigzagged hairpin turns, to be electrically connected to another electrode 40A.

Each electrode 40A can have a laminated structure in which a plurality of metallic layers are laminated. Specifically, each electrode 40A includes a terminal section $41_1$ extending from a corresponding end portion from among both end portions of the resistor $30_1$; and a metallic layer $42_1$ formed on an upper surface of the terminal section $41_1$. Note that for the sake of convenience, the resistor $30_1$ and the terminal sections $41_1$ are expressed by different numerals. However, the resistor and the terminal sections can be integrally formed of the same material, in the same process.

For the material of the metallic layer $42_1$, material having increasing solder wettability than the terminal sections $41_1$ can be selected. For example, when the resistor $30_1$ is a Cr composite film, the material of the metallic layer $42_1$ includes Cu, Ni, Al, Ag, Au, Pt, or the like; an alloy of any metals among the above metals; a compound of any metal among the above metals; or a laminated film in which any metal among the metals, the alloy, and the compound are laminated as appropriate. The thickness of the metallic layer $42_1$ is not particularly restricted, and can be appropriately selected for any purpose. For example, the thickness can be approximately between 0.01 µm and 30 µm. Taking into account dissolution of metallization, the thickness of the metallic layer $42_1$ is preferably 1 µm or more, and more preferably 3 µm or more. Note that when the metallic layer $42_1$ is formed by electrolytic plating, the thickness of the metallic layer $42_1$ is preferably 30 µm or less in terms of ease of electrolytic plating.

Note, however, that, when solder wettability or dissolution of metallization will not become a problem, each terminal section $41_1$ itself may be used as an electrode without laminating the metallic layer $42_1$.

The resistor $30_1$ includes a plurality of resistive patterns 31 that are juxtaposed such that the longitudinal direction of each resistive pattern is towards the same direction (in the example in FIG. 1, the X direction), and includes folded portions 33 each of which connects outer sides of end portions of respective resistive patterns 31 that are next to each other.

On the folded portions 33, a metallic layer $43_1$ formed of a material of which a gauge factor is less than that of the resistor $30_1$ is laminated. The material and thickness of the metallic layer $43_1$ are selected such that the resistance value of the metallic layer $43_1$ on each folded portion 33 is less than the resistance value of the folded portion 33.

Note that in FIG. 1, each folded portion 33 of the resistor $30_1$ is linear. However, the folded portion is not limited to being linear and may have any shape. For example, the folded portion of the resistor $30_1$ may have a curved shape, or have a combination of a linear portion and a curved portion.

The material of the metallic layer $43_1$ is not particularly restricted as long as it is a material of which a gauge factor is less than that of the resistor $30_1$. The material can be appropriately selected for any purpose. For example, when the resistor $30_1$ is a Cr composite film, the material of the metallic layer $43_1$ includes Cu, Ni, Al, Ag, Au, Pt, or the like; an alloy of any metals among the above metals; a compound of any metal among the above metals; or a laminated film in which any metal among the metals, the alloy, and the compound are laminated as appropriate. When the resistance value of the metallic layer $43_1$ on each folded portion 33 can be less than the resistance value of the folded portion 33, the thickness of the metallic layer $43_1$ is not particularly restricted, and can be appropriately selected for any purpose. For example, the thickness can be approximately between 0.01 μm and 30 μm.

The metallic layer $43_1$ may be formed of the same material as the metallic layer $42_1$, in the same process as the metallic layer $42_1$. Alternatively, the metallic layer $43_1$ may be formed of a different material from the metallic layer $42_1$, in a different process from the metallic layer $42_1$. In this case, the thickness of the metallic layer $43_1$ is not required to be the same as the thickness of the metallic layer $42_1$. Note that in FIG. 1, for the sake of convenience, the resistive patterns 31, the metallic layer $42_1$, and the metallic layer $43_1$ are each illustrated in a crepe pattern.

A cover layer $60_1$ (insulating resin layer) may be provided on and above the upper surface 10a of the substrate 10, such that the resistor $30_1$ and the metallic layer $43_1$ are coated and the electrodes 40A are exposed. With the cover layer $60_1$ being provided, mechanical damage, and the like can be prevented from occurring in the resistor $30_1$ and the metallic layer $43_1$. Additionally, with the cover layer $60_1$ being provided, the resistor $30_1$ and the metallic layer $43_1$ can be protected against moisture, and the like. Note that the cover layer $60_1$ may be provided to cover a wider area excepting the terminal sections 40A.

The cover layer $60_1$ can be formed of an insulating resin such as a PI resin, an epoxy resin, a PEEK resin, a PEN resin, a PET resin, a PPS resin, or a composite resin (e.g., a silicone resin or a polyolefin resin). The cover layer $60_1$ may contain fillers or pigments. The thickness of the cover layer $60_1$ is not particularly restricted, and can be appropriately selected for any purpose. For example, the thickness may be approximately between 2 μm and 30 μm.

The humidity detecting unit 1H includes a metallic layer $30_2$, a metallic layer $43_2$, electrodes 40B, and a moisture sensitivity layer $60_2$ that are each formed on or above the substrate 10.

The metallic layer $30_2$ has two interdigitated patterns that are formed on the substrate 10, and that are interlaced so as not to contact with respect to each other. The metallic layer $30_2$ may be formed directly on the upper surface 10a of the substrate 10, or be formed above the upper surface 10a of the substrate 10, via other layer(s). For example, the material and thickness of the metallic layer $30_2$ can be the same as the material and thickness of the resistor $30_1$.

The metallic layer $43_2$ has the planar shape pattern that is the same as the planar shape pattern of the metallic layer $30_2$, and that is laminated on the metallic layer $30_2$. For example, the material and thickness of the metallic layer $43_2$ can be the same as the material and thickness of the metallic layer $43_1$.

Each electrode 40B can have a laminated structure in which the metallic layer $42_2$ is laminated on a terminal section $41_2$. The terminal sections $41_2$ extend from both end portions of the metallic layer $30_2$, and are each formed to have an approximately rectangular shape in a plan view. The metallic layer $42_2$ extends from both end portions of the metallic layer $43_2$, and is formed to have an approximately rectangular shape on each terminal section $41_2$, in a plan view.

In other words, the electrodes 40B include a pair of terminal sections $41_2$ that extend from both end portions of the metallic layer $30_2$ having the respective interdigitated patterns, and include the metallic layer $42_2$ that extends, from the end portions of the metallic layer $43_2$ having the respective interdigitated patterns, on each terminal section $41_2$.

Note that the metallic layer $30_2$, the terminal sections $41_2$, the metallic layer $43_2$, and the terminal sections $42_2$ are formed such that the metallic layer $30_2$ and a given terminal section $41_2$ overlap the metallic layer $43_2$ and a given terminal section $42_2$, in a plan view.

The metallic layers $30_2$ and $43_2$ each of which has one interdigitated pattern connected to one electrode among the electrodes 40B are not electrically connected directly to the metallic layers $30_2$ and $43_2$ each of which has the other interdigitated pattern connected to the other electrode 40B. The one interdigitated pattern and the other interdigitated pattern are electrically connected via the moisture sensitive layer $60_2$ that bridges at least a gap between the two interdigitated patterns. The moisture sensitive layer $60_2$ may be formed on the two interdigitated patterns, as well as bridging the gap between the two interdigitated patterns.

The moisture sensitive layer $60_2$ is formed of a material (a resistance value decreases as humidity increases) of which a resistance value varies according to moisture absorption and dehumidifying. The material of the moisture sensitive layer $60_2$ is not particularly restricted as long as it is a material of which the resistance value varies according to moisture absorption and dehumidifying. The material can be appropriately selected for any purpose. Examples of the moisture sensitive layer $60_2$ include lithium chloride (LiCl), sulfonated polystyrene, potassium metaphosphate ($KPO_3$), phosphorus pentoxide ($P_2O_5$), carbon (C), selenium (Se), germanium (Ge), silicon (Si), aluminum oxide ($Al_2O_3$), chromium oxide ($Cr_2O_3$), nickel oxide ($Ni_2O_3$), iron ($FeO_3$), zinc oxide (ZnO), magnesiochromite ($MgCr_2O_4$), magnesium aluminate ($MgAl_2O_4$), magnesiophelite ($MgFe_2O_4$), and the like. The thickness of the moisture sensitive layer $60_2$ is not particularly restricted and can be appropriately selected for any purpose. For example, the thickness can be approximately between 1 μm and 30 μm.

The electrodes 40B are a pair of electrodes for externally outputting a change in a given resistance value of the moisture sensitive layer $60_2$ in accordance with a change in ambient, humidity of the strain detecting unit 1S. where, for example, a lead wire for external connection, or the like, is joined. The temperature detecting unit 1T includes a metallic layer $30_3$, a metallic layer $43_3$, and electrodes 40C that, are each formed on or above the substrate 10.

The metallic layer $30_3$ is a thin film that is formed on the substrate 10 to have a flat shape. The metallic layer $30_3$ may be formed directly on the upper surface 10a of the substrate 10, or be formed above the upper surface 10a of the substrate 10, via other layer(s). For example, the material and thickness of the metallic layer $30_3$ can be the same as the material and thickness of each of the resistor $30_1$ and the metallic layer $30_2$.

The metallic layer $43_3$ is a thin film that is laminated on the metallic layer $30_3$ to have a flat shape. For example, the material and thickness of the metallic layer $43_3$ can be the same as the material and thickness of each of the metallic layer $43_1$ and the metallic layer $43_2$. Because the metallic layer $30_3$ and the metallic layer $43_3$ are each formed of a different material, the metallic layer $30_3$ and the metallic layer $43_3$ can serve as a thermocouple. With the metallic layers $30_3$ and $43_3$ being each a thin film having a flat shape, temperature detection is achieved accurately with reducing the effect of strain.

Each electrode 40C can have a laminated structure in which a metallic layer $42_3$ is laminated on a terminal section $41_3$. The terminal sections $41_3$ extend from both end portions of the metallic layer $30_3$, and are each formed to have an approximately rectangular shape in a plan view. One part of the metallic layer $42_3$ extends from one end portion of the metallic layer $43_3$, and is formed on one terminal section $41_3$ to have an approximately rectangular shape in a plan view. The other part of the metallic layer $42_3$ is formed on the other terminal section $41_3$ to have an approximately rectangular shape, and is not electrically connected to the metallic layer $43_3$.

The electrodes 40C are a pair of electrodes for externally outputting 3 potential difference (thermoelectric power) set between the metallic layer $30_3$ and the metallic layer $43_3$ in accordance with a change in ambient temperature of the strain detecting unit 1S. Where, for example, a lead wire for external connection, or the like is joined.

A moisture-barrier layer $60_3$ may be provided on and above the upper surface 10a of the substrate 10, such that the metallic layers $30_3$ and $43_3$ are coated and the electrodes 40C are exposed. With the moisture-barrier layer $60_3$ being provided, temperature detection is achieved accurately with reducing the effect of moisture in the metallic layers $30_3$ and $43_3$. Note that the moisture-barrier layer $60_3$ may be provided to cover a wider area excepting the electrodes 40C.

The material of the moisture-barrier layer $60_3$ is not particularly restricted as long as it is a material capable of reducing the effect of moisture in the metallic layers $30_3$ and $43_3$. The material can be appropriately selected for any purpose, and examples of the material include high density polyethylene, polyvinylidene chloride, polytetrafluoroethylene, polypropylene, butyl rubber, and the like. The thickness of the moisture-barrier layer $60_3$ is not particularly restricted, and can be appropriately selected for any purpose. For example, the thickness can be approximately between 2 μm and 30 μm.

Note that for the sake of convenience, the resistor $30_1$, the terminal sections $41_1$, the metallic layer $30_2$, the terminal sections $41_2$, the metallic layer $30_3$, and the terminal sections $41_3$ are represented by different numerals. However, these can be integrally formed of the same material in the same process. Further, for the sake of convenience, the metallic layer $42_1$, the metallic layer $43_1$, the metallic layer $42_2$, the metallic layer $43_2$, the metallic layer $42_3$, and the metallic layer $43_3$ are represented by different numerals. However, these can be integrally formed of the same material in the same process.

Figure 4A:
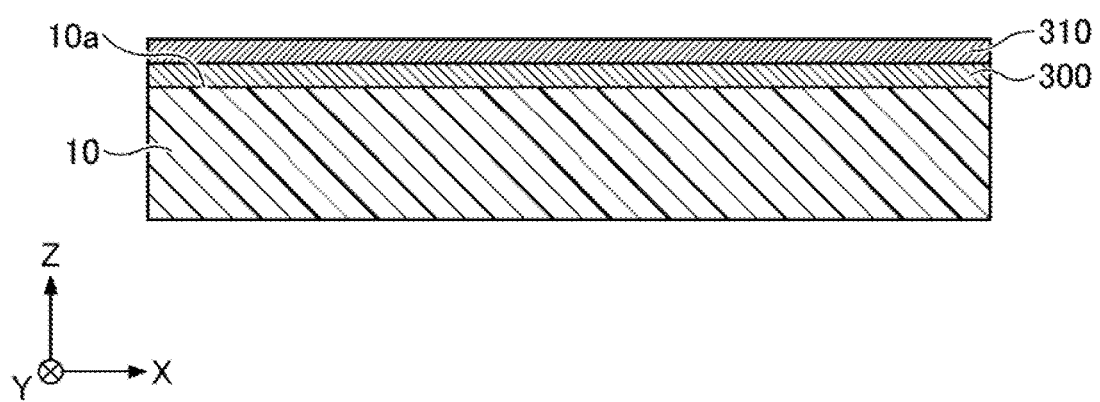
FIG. 4A is a diagram (part 1) of an example of a method of manufacturing the strain gauge according to the first embodiment.
Figure 4B:
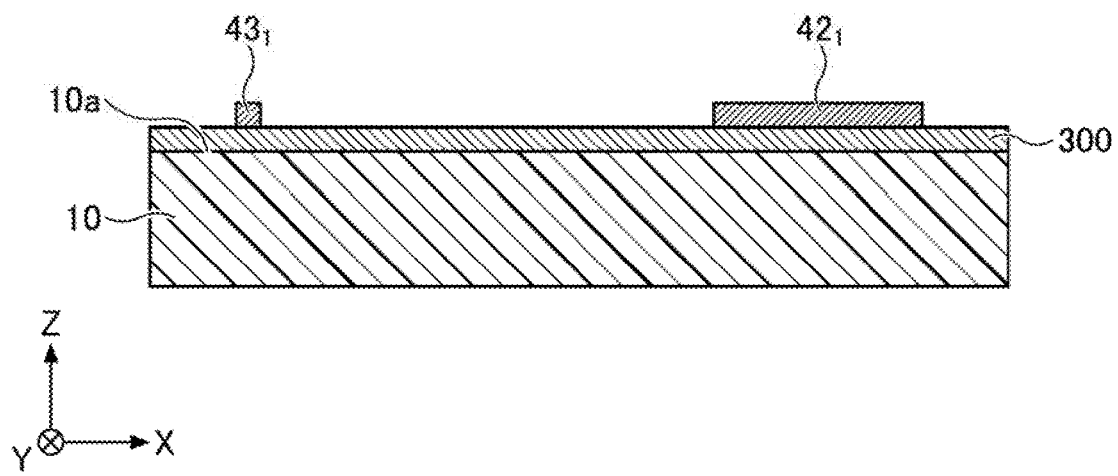
FIG. 4B is a diagram (part 2) of an example of the method of manufacturing the strain gauge according to the first embodiment.
Figure 4C:
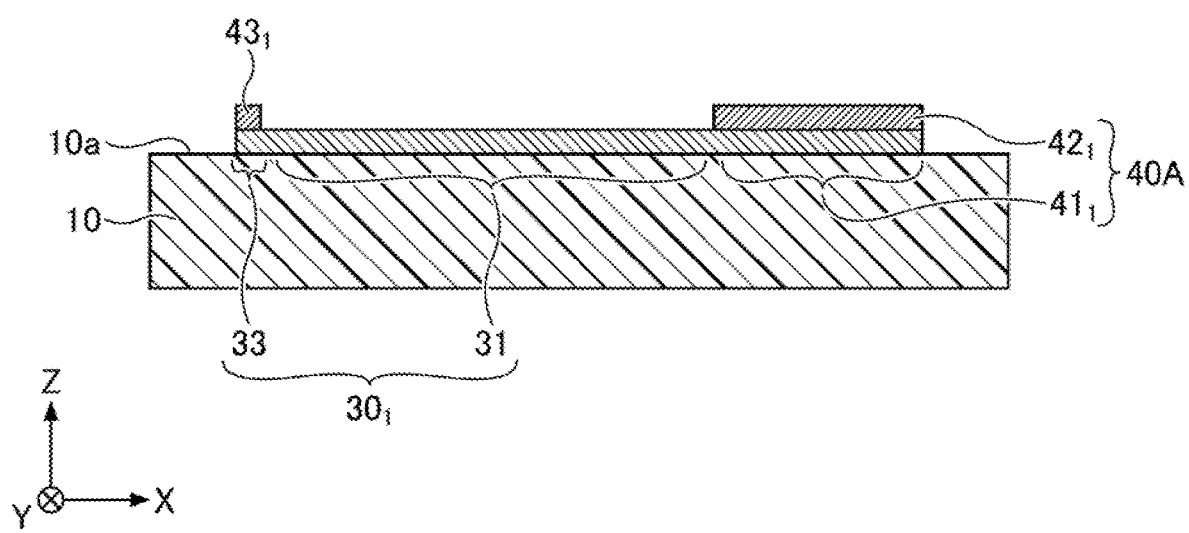
FIG. 4C is a diagram (part 3) of an example of the method of manufacturing the strain gauge according to the first embodiment.

FIGS. 4A to 4C are diagrams illustrating an example of the process of manufacturing the strain gauge according to the first embodiment, and each illustrate a cross section corresponding to FIG. 3B. Each of the humidity detecting unit 1H and the temperature detecting unit 1T has the similar layer structure to the strain detecting unit 1S; accordingly, illustration of the cross-section view and the like of those units is omitted.

In order to manufacture the strain gauge 1, first, in the process illustrated in FIG. 4A, the substrate 10 is prepared and a metallic layer 300 is formed on the upper surface 10a of the substrate 10. Further, a metallic layer 310 is formed on the metallic layer 300.

The metallic layer 300 is finally patterned to become a layer that constitutes the resistor $30_1$, the terminal sections $41_1$, the metallic layer $30_1$, the terminal sections $41_2$, the metallic layer $30_3$, and the terminal sections $41_3$. In this case, the material and thickness of the metallic layer 300 are the same as the material and thickness of the resistor $30_1$ and the like, as described above. The metallic layer 310 is finally patterned to become a layer that constitutes the metallic layer $42_1$, the metallic layer $43_1$, the metallic layer $42_2$, the metallic layer $43_2$, the metallic layer $42_3$, and the metallic layer $43_3$. In this case, the material and thickness of the metallic layer 310 are the same as the material and thickness of the metallic layer $42_1$ and the like, as described above.

The metallic layer 300 can be deposited by magnetron sputtering in which, for example, a raw material capable of forming the metallic layer 300 is the target. Instead of magnetron sputtering, the metallic layer 300 may be deposited by reactive sputtering, vapor deposition, arc ion plating, pulsed laser deposition, or the like. From the viewpoint of stabilizing the gauge characteristics, before depositing the metallic layer 300, preferably, as a base layer, a functional layer having a film thickness that is approximately between 1 nm and 100 nm is vacuum-deposited on the upper surface 10a of the substrate 10, by conventional sputtering, for example.

In the present application, the functional layer refers to a layer that has a function of promoting crystal growth of the metallic layer 300 (resistor $30_1$) that is at least an upper layer. The functional layer preferably further has a function of preventing oxidation of the metallic layer 300 caused by oxygen and moisture included in the substrate 10, as well as a function of improving adhesion between the substrate 10 and the metallic layer 300. The functional layer may further have other functions.

The insulating resin film that constitutes the substrate 10 contains oxygen and moisture. In this regard, particularly when the metallic layer 300 includes Cr, it is effective for the functional layer to have a function of preventing oxidation of the metallic layer 300, because Cr forms an autoxidized film.

The material of the functional layer is not particularly restricted as long as it is material having a function of promoting crystal growth of the metallic layer 300 (resistor $30_1$) that is at least an upper layer. Such material can be appropriately selected for any purpose, and includes one or more types of metals selected from a group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Cs (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10a of the substrate 10 is etched with Ar. Thus, a deposited amount of films of the functional layer is minimized and thus an effect of improving adhesion can be obtained.

However, this is an example of a method of depositing the functional layer, and the functional layer may be formed by other methods. For example, before depositing the functional layer, the upper surface 10a of the substrate 10 is activated by plasma treatment, etc. using Ar, or the like to thereby obtain the effect of improving the adhesion; subsequently, the functional layer may be vacuum-deposited by magnetron sputtering.

A combination of the material of the functional layer and the material of the metallic layer 300 is not particularly restricted, and can be appropriately selected for any purpose. For example, Ti is used for the functional layer, and a Cr composite film formed with α-Cr (alpha-chromium) as the main component can be deposited as the metallic layer 300.

In this case, the metallic layer 300 can be deposited by, for example, magnetron sputtering in which a raw material capable of forming the Cr composite film is the target and in which an Ar gas is supplied to a chamber. Alternatively, the metallic layer 300 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain detecting unit 1S can be 10 or more, as well as the gauge factor temperature coefficient TCS and temperature coefficient of resistance TCR being able to be each in the range of from −1000 ppm/° C. to +1000 ppm/° C. Note that, when the functional layer is formed of Ti, the Cr composite film may include Ti or TiN (titanium nitride).

Note that when the metallic layer 300 is a Cr composite film, the functional layer formed of Ti includes all functions being a function of promoting crystal growth of the metallic layer 300; a function of preventing oxidation of the metallic layer 300 caused by oxygen or moisture contained in the substrate 10; and a function of improving adhesion between the substrate 10 and the metallic layer 300. Instead of Ti, when the functional layer is formed of Ta, Si, Al, or Fe, the functional layer also includes the same functions.

As described above, with the functional layer being provided in the lower layer of the metallic layer 300, the crystal growth of the metallic layer 300 can be promoted and thus the metallic layer 300 having a stable crystalline phase can be fabricated. As a result, with respect to the strain detecting unit 1S, the stability of the gauge characteristics can be improved. Also, the material that constitutes the functional layer is diffused, into the metallic layer 300, so that the gauge characteristics of the strain detecting unit 1S can be thereby improved.

The metallic layer 310 can be deposited by magnetron sputtering in which, for example, a raw material capable of forming the metallic layer 310 is the target. Instead of magnetron sputtering, the metallic layer 310 may be deposited by reactive sputtering, vapor deposition, plating, arc ion plating, pulsed laser deposition, or the like. When the metallic layer 310 is thickly formed, plating is preferably selected.

In the process illustrated in FIG. 4B, the metallic layer 310 is patterned by photolithography, so that the metallic layer $42_1$, the metallic layer $43_1$, the metallic layer $42_2$, the metallic layer $43_2$, the metallic layer $42_3$, and the metallic layer $43_3$ each of which has the planar shape illustrated in FIG. 1 are formed. Then, in the process illustrated in FIG. 4C, the metallic layer 300 is patterned by photolithography, so that the resistor $30_1$, the terminal sections $41_1$, the metallic layer $30_2$, the terminal sections $41_2$, the metallic layer $30_3$, and the terminal sections $41_3$ each of which has the planar shape illustrated in FIG. 2 are formed.

Thereby, in the strain detecting unit 1S, the metallic layer $43_1$ is laminated on the folded portions 33 of the resistor $30_1$. Further, in the strain detecting unit 1S, the metallic layer $42_1$ is laminated on the terminal sections $41_1$, so that the electrodes 40A are formed. In the humidity detecting unit 1H, the metallic layer $43_2$ is laminated on the metallic layer $30_2$. Further, in the humidity detecting unit 1H, the metallic layer $42_2$ is laminated on the terminal sections $41_2$, so that the electrodes 40B are formed. In the temperature detecting unit 1T, the metallic layer $43_3$ is laminated on the metallic layer $30_3$. Further, in the temperature detecting unit 1T, the metallic layer $42_1$ is laminated on the terminal sections $41_3$, so that the electrodes 40C are formed.

After the process illustrated in FIG. 4C, the cover layer $60_1$ is provided on and above the upper surface 10a of the substrate 10 such that the resistor $30_1$ and the metallic layer $43_1$ are coated and the electrodes 40A are exposed; the moisture sensitive layer $60_2$ is provided on and above the upper surface 10a of the substrate 10 such that the metallic layer $30_2$ and the metallic layer $43_2$ are coated and the electrodes 40B are exposed; and the moisture-barrier layer $60_3$ is provided on and above the upper surface 10a of the substrate 10 such that the metallic layer $30_3$ and the metallic layer $43_3$ are coated and the electrodes 40C are exposed. Thereby, the strain gauge 1 is completed. Note, however, that the cover layer $60_1$ and the moisture-barrier layer $60_3$ may be provided as necessary.

For example, the cover layer $60_1$ can be fabricated, such that a thermosetting insulating resin film in a semi-cured state is laminated on the upper surface 10a of the substrate 10, and such that the resistor $30_1$ and the metallic layer $43_1$ are coated therewith and the electrodes 40A are exposed; subsequently, heat is added and curing is performed. The cover layer $60_1$ may be formed, such that a thermosetting insulating resin that is liquid or paste-like is applied to the upper surface 10a of the substrate 10, and such that the resistor $30_1$ and the metallic layer $43_1$ are coated therewith and the electrodes 40A are exposed; subsequently, heat is added and curing is performed. The moisture sensitive layer $60_2$ and the moisture-barrier layer $60_3$ can be fabricated by the method that is the same as described in the cover layer $60_1$.

Figure 5A:
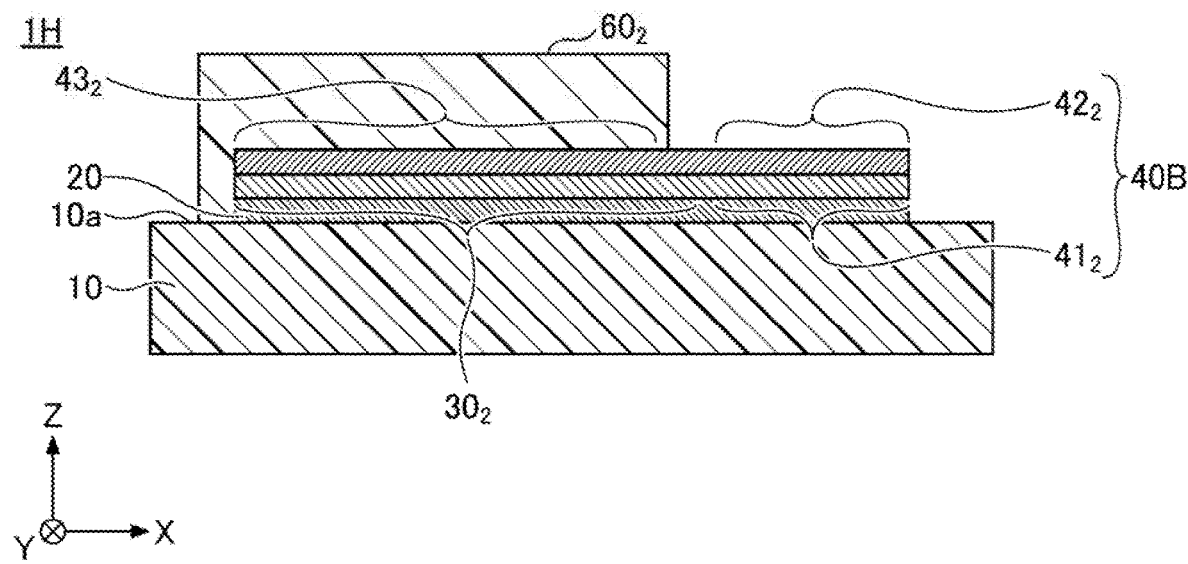
FIG. 5A is a cross-sectional view (part 4) of an example of the strain gauge according to the first embodiment.
Figure 5B:
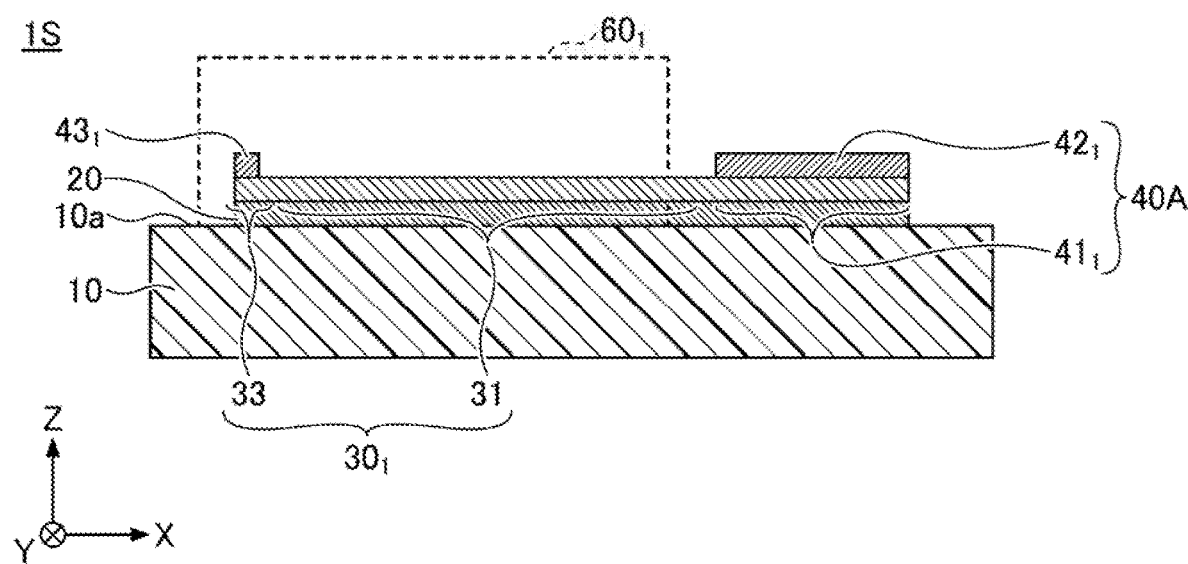
FIG. 5B is a cross-sectional view (part 5) of an example of the strain gauge according to the first embodiment.
Figure 5C:
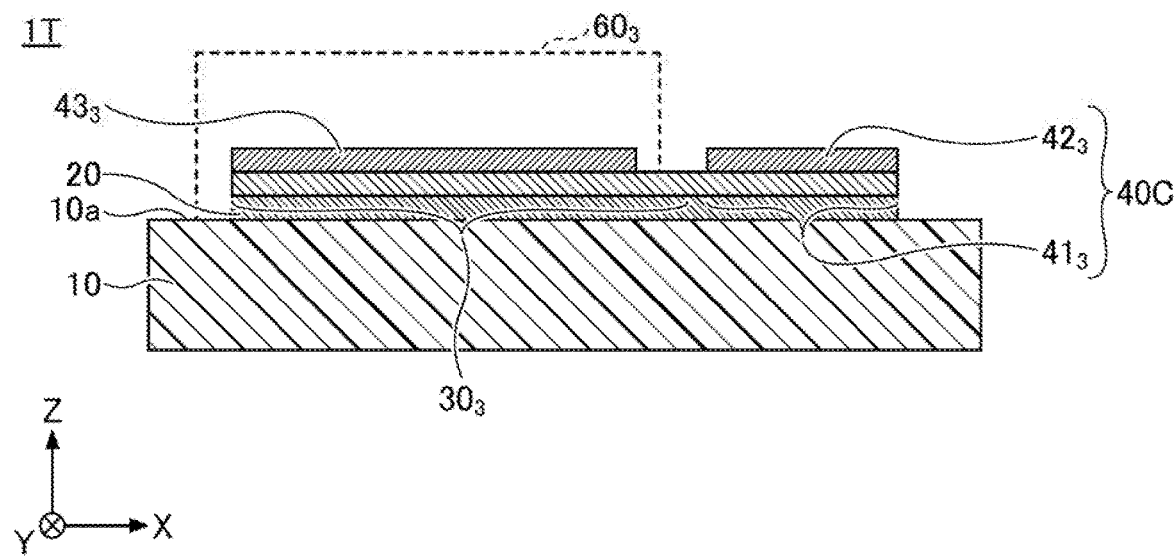
FIG. 5C is a cross-sectional view (part 6) of an example of the strain gauge according to the first embodiment.

Note that when the functional layer as a base layer of the metallic layer 300 is provided on the upper surface 10a of the substrate 10, the strain gauge 1 (the humidity detecting unit 1H, the strain detecting unit 1S, and the temperature detecting unit 1T) has the cross-section shapes illustrated in FIGS. 5A to 5C. A layer expressed by the numeral 20 indicates the functional layer. The planar shape of the strain gauge 1 in the case of providing the functional layer 20 is similar to that in FIG. 1 and FIG. 2.

Note that in the above process, the example in which the metallic layer $42_1$, the metallic layer $43_1$, the metallic layer $42_2$, the metallic layer $43_2$, the metallic layer $42_3$, and the metallic layer $43_3$ are formed of the same material has been described. However, such a process is an example. As described above, the metallic layer $42_1$, the metallic layer $42_2$, and the metallic layer $42_3$ may be formed using different materials, in a different process, from the metallic layer $43_1$, the metallic layer $43_2$, and the metallic layer $43_3$. The metallic layer $42_1$, the metallic layer $42_2$, and the metallic layer $42_3$ may not be provided.

As described above, in the strain gauge 1, the temperature detecting unit 1T is disposed proximal to the strain detecting unit 1S and on or above the same substrate 10. Thereby, the ambient temperature of the resistor $30_1$ is detected by the temperature detecting unit 1T, and ambient temperature information of the resistor $30_1$ can be output to the outside of the strain gauge 1. As a result, even when there is variation in the TCR of the resistor $30_1$, an external circuit performs a correction operation of a result detected by the strain detecting unit 1S, based on a result detected by the temperature detecting unit 1T. Thereby, strain can be accurately calculated with reducing the effect of a temperature change.

Due to the material of the substrate or the resistor, there are cases of a change in the TCR. in accordance with humidity that could become a problem. In this case, an external circuit performs a correction operation using a result detected by the humidity detecting unit 1H, as well as the result detected by the temperature detecting unit 1T. Thereby, strain can be accurately calculated with reducing the effect of the temperature change and a humidity change.

In the strain detecting unit 1S, the metallic layer $43_1$ formed of a material of which a gauge factor is less than that of the resistor $30_1$ is laminated on the folded portions 33 of the resistor $30_1$. Further, the resistance value of the metallic layer $43_1$ on the folded portions 33 is less than the resistance value of each folded portion 33. Thereby, sensitivity in a given error detection direction decreases and thus detection accuracy of strain at the strain detecting unit 1S can be improved.

In other words, at each folded portion 33 of the resistor $30_1$, a considerable amount of current flows into the metallic layer $43_1$ of which the resistance value is less than that of the folded portion 33. For this reason, even when strain occurs in a given error detection direction (in this case, the Y direction) in which each folded portion 33 of the resistor $30_1$ extends, the output obtained from the electrodes 40A is not large because the output is mainly from the metallic layer $43_1$ side of which a gauge factor is less than that of the resistor $30_1$. In contrast, at the resistor $30_1$ other than the folded portions 33, the entirety of the current flows into the resistor $30_1$ of which a gauge factor is increased. For this reason, when strain occurs in the grid direction (in this case, the X direction) of the resistor $30_1$, the increased output is obtained from the electrodes 40A. As a result, detection accuracy of strain in the grid direction (in this case, the X direction) can be improved. Note, however, that when a change in the resistance value due to strain in a given error detection direction will not become a problem, the metallic layer $43_1$ may not be provided.

Such an effect is achieved regardless of the material of the resistor $30_1$. Particularly, when a Cr composite film of which a gauge factor is increased is used as the resistor $30_1$, the effect is obtained notably.

Modification 1 of the First Embodiment

Modification 1 of the first embodiment will be described using an example in which a structure proximal to each folded portion of the strain detecting unit differs. Note that in the modification 1 of the first embodiment, explanation for the components that are the same as having been described in the embodiment, may be omitted.

The strain detecting unit 1S described in the first embodiment can be modified as described in the strain detecting unit 2S, 3S, or 4S below. Note that in the modification 1 of the first embodiment, the humidity detecting unit 1H and the temperature detecting unit 1T each have the same configuration as described in the first embodiment.

Figure 6A:
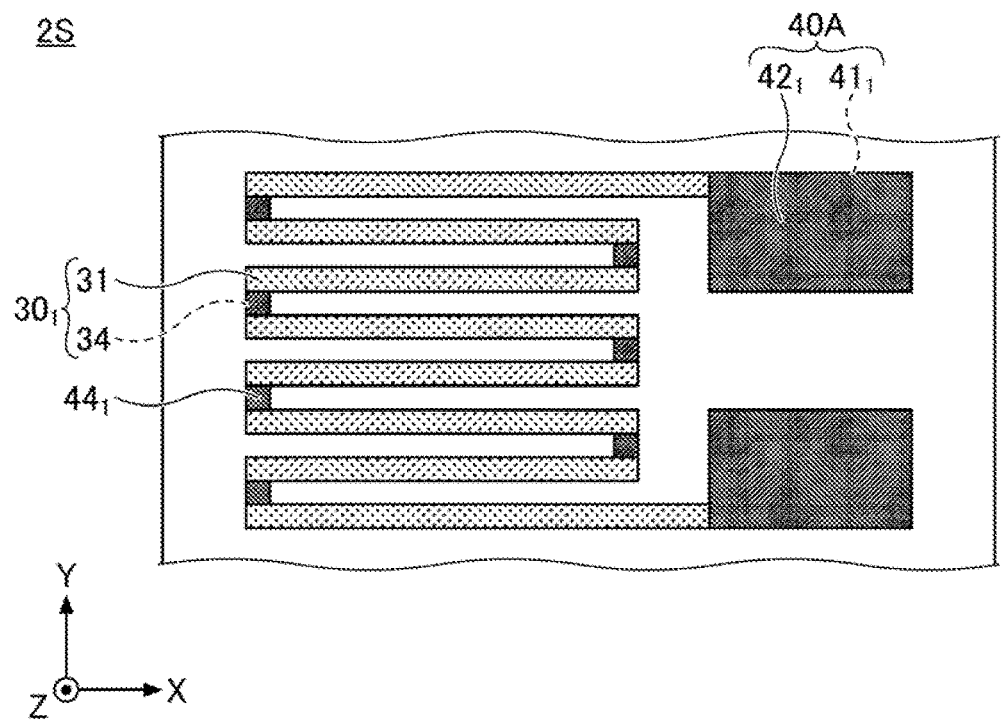
FIG. 6A is a plan view (part 1) of an example of a strain detecting unit according to modification 1 of the first embodiment.

FIG. 6A is a plan view (part 1) of an example of the strain detecting unit according to the modification 1 of the first embodiment. Referring to FIG. 6A, the strain detecting unit 2S differs from the strain detecting unit 1S (see FIG. 1 and the like) in that folded portions 34 are used instead of the folded portions 33; and a metallic layer $44_1$ is used instead of the metallic layer $43_1$.

The resistor $30_1$ includes a plurality of resistive patterns 31 that are juxtaposed such that the longitudinal direction of each resistive pattern is towards the same direction (in the example in FIG. 6A, the X direction), and includes folded portions 34 each of which connects facing sides of end portions of respective resistive patterns 31 that are next to each other.

On the folded portions 34, a metallic layer $44_1$ formed of a material of which a gauge factor is less than that of the resistor $30_1$ is laminated. The material and thickness of the metallic layer $44_1$ are selected such that the resistance value of the metallic layer $44_1$ on the folded portions 34 is less than the resistance value of each folded portion 34. For example, the material and thickness of the metallic layer $44_1$ can be the same as the material and thickness of the metallic layer $43_1$.

As is the case with the folded portion 33 illustrated in FIG. 1, a portion that connects outer sides of the end portions of respective resistive patterns 31 that are next to each other, may be regarded as the folded portion of the resistor $30_1$. Alternatively, as is the case with the folded portion 34 illustrated in FIG. 6A, a portion that connects facing sides of the resistive patterns 31 that are next to each other, may be regarded as the folded portion of the resistor $30_1$.

In either of the above cases, the metallic layer formed of a material of which a gauge factor is less than that of the resistor $30_1$ is laminated on the folded portions of the resistor $30_1$. Further, the resistance value of the metallic layer on the folded portions is less than the resistance value of each folded portion. Thereby, sensitivity in a given error detection direction decreases and thus detection accuracy of strain at the strain detecting unit can be improved.

Figure 6B:
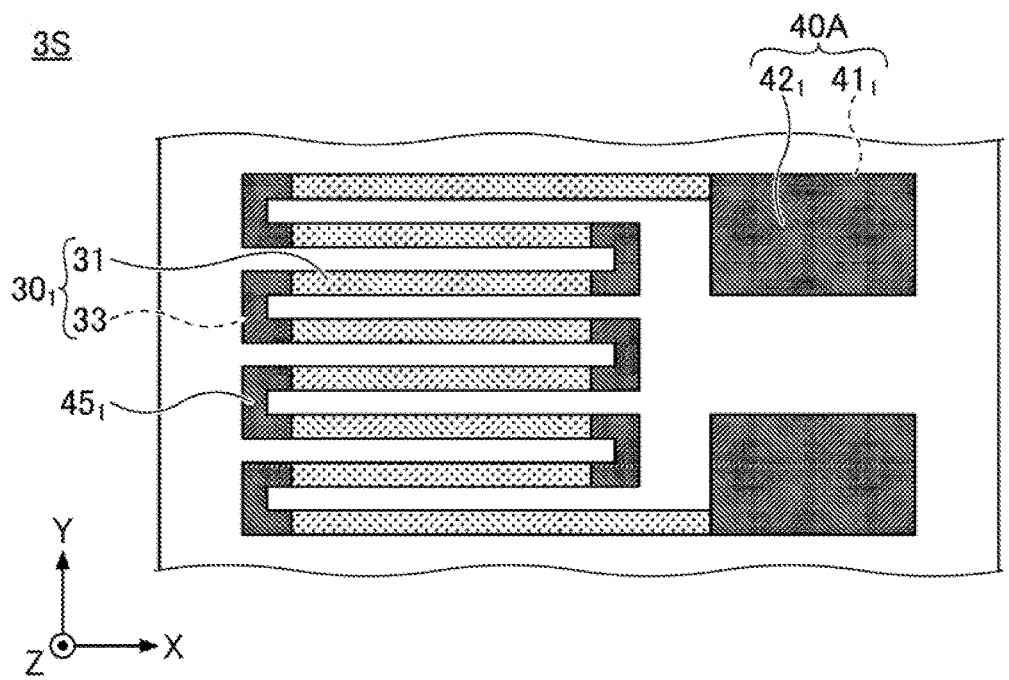
FIG. 6B is a plan view (part 2) of an example of a strain detecting unit according to modification 1 of the first embodiment.

FIG. 6B is a plan view (part 2) of an example of the strain detecting unit according to the modification 1 of the first embodiment. Referring to FIG. 6B, the strain detecting unit 3S differs from the strain detecting unit 1S (see FIG. 1 and the like) in that a metallic layer $45_1$ is used instead of the metallic layer $43_1$.

The metallic layer $45_1$ is laminated on the folded portions 33 of the resistor $30_1$, and further extends, from being on each folded portion 33, to being on portions of given resistive patterns 31, so that the metallic layer $45_1$ is formed to have a U-shape as a whole. For example, the material and thickness of the metallic layer $45_1$ can be the same as the material and the thickness of the metallic layer $43_1$.

As described above, the portion of the metallic layer $45_1$ may extend, from being on each folded portion 33, to being on the portions of given resistive patterns 31. In this case, the metallic layer $45_1$ can be reliably laminated on the folded portions 33, even taking into account manufacturing variation. As a result, sensitivity in a given error detection direction decreases reliably, and thus detection accuracy of strain at the strain detecting unit 3S can be reliably improved.

Note, however, that in the strain detecting unit 3S, because a length (length of a portion at which the metallic layer $45_1$ is not laminated) of each resistive pattern 31 in the grid direction is slightly less than that in the strain detecting unit 1S, detection sensitivity is assumed to decrease slightly.

Figure 6C:
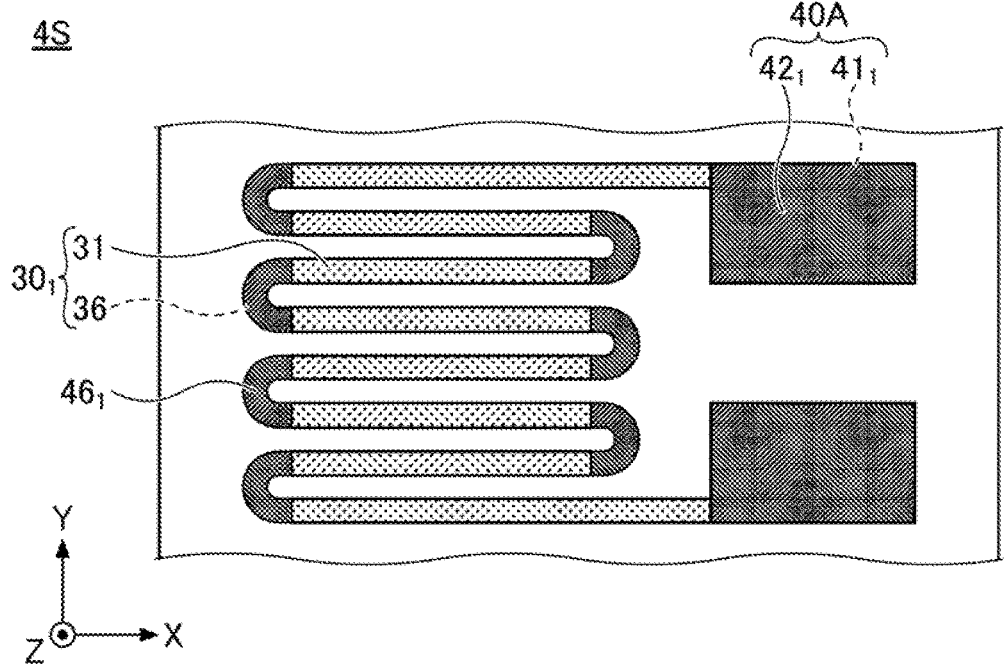
FIG. 6C is a plan view (part 3) of an example of a strain detecting unit according to modification 1 of the first embodiment.

FIG. 6C is a plan view (part 3) of the strain detecting unit according to the modification 1 of the first embodiment. Referring to FIG. 6C, the strain detecting unit 4S differs from the strain detecting unit 1S (see FIG. 1 and the like) in that folded portions 36 are used instead of the folded portions 33; and a metallic layer $46_1$ is used instead of the metallic layer $43_1$.

The resistor $30_1$ includes a plurality of resistive patterns 31 that are juxtaposed such that the longitudinal direction of each resistive pattern is towards the same direction (in the example in FIG. 6C, the X direction), and includes folded portions 36 each of which connects outer ends of the end portions of respective resistive patterns 31 that are next to each other.

The metallic layer $46_1$ formed of a material of which a gauge factor is less than that of the resistor $30_1$ is laminated on the folded portions 36. The material and thickness of the metallic layer $46_1$ are selected such that the resistance value of the metallic layer $46_1$ on the folded portions 36 is less than the resistance value of each folded portion 36. For example, the material and thickness of the metallic layer $46_1$ can be the same as the material and thickness of the metallic layer $43_1$.

Each folded portion 36 is formed to have a curved shape (e.g., U-shape), which differs from the folded portion 33 (see FIG. 1). In this case as well, the metallic layer $46_1$ formed of a material of which a gauge factor is less than that of the resistor $30_1$ is laminated on the folded portions 36 of the resistor $30_1$. Further, the resistance value of the metallic layer $46_1$ on the folded portions 36 is less than the resistance value of each folded portion 36. Thereby, sensitivity in a given error detection direction decreases and thus detection accuracy of strain at the strain detecting unit 4S can be improved.

Note that in the strain detecting unit 4S, a portion of the metallic layer $46_1$ may extend, from being on each folded portion 36, to being on portions of given resistive patterns 31, as in the case with the strain detecting unit 3S. In this case, the metallic layer $46_1$ can be reliably laminated on the folded portions 36, even taking into account manufacturing variation. As a result, sensitivity in a given error detection direction decreases reliably, and thus detection accuracy of strain at the strain detecting unit 4S can be reliably improved. Note, however, that because a length (length of a portion at which the metallic layer $46_1$ is not laminated) of each resistive pattern 31 in the grid direction slightly decreases, detection sensitivity is assumed to decrease slightly.

The preferred embodiment and the like have been described above in detail, but are not limited to the embodiment and the like described above. Various modifications and alternatives to the above embodiment and the like can be made without departing from a scope set forth in the claims.

For example, due to the material of the substrate or the resistor, when a change in the TCR in accordance with humidity will not become a problem, the strain gauge ray be constituted by only the strain detecting unit and the temperature detecting unit, without providing the humidity detecting unit.

This International application claims priority to Japanese Patent Application No. 2018-017051, filed Feb. 2, 2018, the contents of which are incorporated herein by reference in their entirety.

REFERENCE SIGNS LIST 1 strain gauge, 1S, 2S, 3S, 4S strain detecting unit 1H humidity detecting unit, 1T temperature detecting unit, 10 substrate, 10a upper surface, 20 functional layer, $30_1$ resistor, $30_2$, $30_3$, $42_1$, $42_2$, $42_3$, $43_1$, $43_2$, $43_3$, $44_1$, $45_1$, $46_1$ metallic layer, 31 resistive pattern, 33, 34, 36 folded portion, 40A, 40B, 40C electrode, $41_1$, $41_2$, $41_3$ terminal section, $60_1$ cover layer, $60_2$ moisture sensitive layer, $60_3$ moisture-barrier layer.

The invention claimed is:

1. A strain gauge comprising:
a strain detecting unit and a temperature detecting unit that are formed on or above a flexible resin substrate, wherein the strain detecting unit includes:
a functional layer formed of a metal, an alloy, or a metal compound, on one surface of the substrate; and
a resistor formed as a film containing Cr, CrN, and $Cr_2N$, on one surface of the functional layer,
wherein the resistor includes a plurality of resistive patterns that are juxtaposed; and a folded portion that connects end portions of given resistive patterns that are next to each other,
wherein a first metallic layer formed of a material of which a gauge factor is less than that of the resistor is laminated on the folded portion, and a resistance value of the first metallic layer on the folded portion is less than a resistance value of the folded portion, and
wherein the temperature detecting unit is a thermocouple including:
a second metallic layer formed of a same material as the resistor, on or above the substrate; and
a third metallic layer formed of a same material as the first metallic layer, on the second metallic layer.

2. The strain gauge according to claim 1, wherein the first metallic layer extends, from being on the folded portion, to being on portions of given resistive patterns.

3. The strain gauge according to claim 1, further comprising first electrodes electrically connected to the resistor, wherein the first electrodes include respective first terminal sections each extending from an end portion of the resistor; and a fourth metallic layer formed on the first terminal sections, and
wherein the first metallic layer and the fourth metallic layer are formed of a same material.

4. The strain gauge according to claim 1, further comprising second electrodes electrically connected to the second metallic layer,
wherein the second electrodes include a pair of second terminal sections extending from both end portions of the second metallic layer; and a fifth metallic layer formed on the second terminal sections,
wherein the fifth metallic layer formed on one second terminal section from among the second terminal sections is electrically connected to the third metallic layer,
wherein the fifth metallic layer formed on another second terminal section is not electrically connected to the third metallic layer, and wherein the third metallic layer and the fifth metallic layer are formed of a same material.

5. The strain gauge according to claim 1, further comprising a humidity detecting unit, the humidity detecting unit including:
two interdigitated patterns that are interlaced so as not to contact each other; and
a moisture sensitive layer that bridges at least a gap between the two interdigitated patterns,
wherein the two interdigitated patterns each include:
a sixth metallic layer formed of a same material as the resistor, on or above the substrate; and
a seventh metallic material formed of a same material as the first metallic layer, on the sixth metallic layer.

6. The strain gauge according to claim 5, further comprising third electrodes electrically connected to the sixth metallic layer,
wherein the third electrodes include a pair of third terminal sections extending from end portions of the sixth metallic layer that has the respective interdigitated patterns; and an eighth metallic layer extending, from end portions of the seventh metallic layer that has the respective interdigitated patterns, on the third terminal sections.

7. The strain gauge according to claim 1, wherein a main component of the resistor is alpha-chromium.

8. The strain gauge according to claim 7, wherein the resistor includes alpha-chromium at 80% by weight or more.

9. The strain gauge according to claim 1, wherein the functional layer includes a function of promoting crystal growth of the resistor.

10. The strain gauge according to claim 1, further comprising an insulating resin layer with which the resistor and the first metallic layer are coated.

11. The strain gauge according to claim 1, further comprising a moisture-barrier layer with which the second metallic layer and the third metallic layer are coated.

* * * * *